US008148440B2

(12) United States Patent
Kuester et al.

(10) Patent No.: US 8,148,440 B2
(45) Date of Patent: Apr. 3, 2012

(54) PROCESS FOR MAKING RIGID URETHANE-MODIFIED POLYISOCYANURATE FOAMS

(75) Inventors: Joern Kuester, Varese (IT); Roberto Fare, Varese (IT); David Alexander Ferguson, Glastonbury (GB)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/772,903

(22) Filed: Feb. 5, 2004

(65) Prior Publication Data

US 2004/0186194 A1    Sep. 23, 2004

Related U.S. Application Data

(63) Continuation of application No. PCT/EP02/09541, filed on Aug. 27, 2002.

(30) Foreign Application Priority Data

Aug. 30, 2001 (EP) .................................. 01830553

(51) Int. Cl.
*C08J 9/14* (2006.01)

(52) U.S. Cl. ........ 521/131; 521/130; 521/170; 521/172; 521/173; 521/174; 521/176

(58) Field of Classification Search ................... 521/130, 521/131, 170, 172, 173, 174, 176
See application file for complete search history.

(56) References Cited

U.S. PATENT DOCUMENTS

| 5,143,945 | A | 9/1992 | Bodnar et al. | |
| 5,523,333 | A * | 6/1996 | Fishback et al. | 521/131 |
| 5,550,168 | A | 8/1996 | Nakamura et al. | |
| 5,688,835 | A * | 11/1997 | Scherbel et al. | 521/131 |
| 5,922,779 | A * | 7/1999 | Hickey | 521/114 |
| 6,207,725 | B1 | 3/2001 | Sieker et al. | |
| 6,359,022 | B1 * | 3/2002 | Hickey et al. | 521/114 |
| 6,403,665 | B1 | 6/2002 | Sieker et al. | |
| 6,528,549 | B2 | 3/2003 | Sieker et al. | |
| 6,602,927 | B1 | 8/2003 | Rothacker | |

FOREIGN PATENT DOCUMENTS

| DE | 4325014 | 2/1995 |
| EP | 6556382 | 6/1995 |
| FR | 1228289 | 8/1960 |
| WO | WO 98/20058 | 5/1998 |
| WO | WO 98/20059 | 5/1998 |
| WO | WO 99/51668 | 10/1999 |

* cited by examiner

*Primary Examiner* — John Cooney
(74) *Attorney, Agent, or Firm* — Robert A. Diaz

(57) ABSTRACT

Process for preparing rigid urethane-modified polyisocyanurate foams from polyisocyanates and polyfunctional isocyanate-reactive components in the presence of a blowing agent, a metal salt trimerisation catalyst and a functionalised carboxylic acid.

19 Claims, No Drawings

US 8,148,440 B2

PROCESS FOR MAKING RIGID URETHANE-MODIFIED POLYISOCYANURATE FOAMS

CROSS REFERENCE TO RELATED APPLICATIONS

This application is a continuation of international application PCT/EP02/09541, filed Aug. 27, 2002.

FIELD OF THE INVENTION

This invention relates to processes for the preparation of rigid urethane-modified polyisocyanurate foams, to foams prepared thereby, and to compositions useful in said processes.

BACKGROUND OF THE INVENTION

Rigid urethane-modified polyisocyanurate (PIR) foams are in general prepared by reacting a stoichiometric excess of polyisocyanate with isocyanate-reactive compounds (usually a polyol) in the presence of a blowing agent, surfactants and catalysts. One use of such foams is as a thermal insulation medium as, for example, in buildings. Urethane-modified polyisocyanurate foams exhibit better fire retardancy, reduced smoke emission in fire situations, and greater thermal stability than polyurethane foams, in general, due to the presence of the isocyanurate groups. Higher index PIR foams are increasingly desirable in construction applications due to more stringent fire regulations and the need for low smoke systems. However, it has shown very difficult to achieve good isocyanurate conversion with slow reacting foam systems as is the case in thick (20 cm) lamination panels and in discontinuous panels. Another disadvantage of PIR foams, in general, is their poor adhesion to facer materials in building panels.

SUMMARY OF THE INVENTION

It is an object of the present invention to provide PIR systems that give good isocyanurate conversion, especially at slow speeds (string time±90 seconds).

The present invention involves a method for making rigid urethane-modified polyisocyanurate foams from polyisocyanates and polyfunctional isocyanate-reactive components in the presence of blowing agents and in the presence of a trimerisation catalyst and a carboxylic acid.

A good isocyanurate conversion can be achieved in lamination systems over a range of panel thicknesses using the same polyol masterbatch. The slow reaction speed required for high thickness panels is achieved by employing a carboxylic acid together with a trimerisation catalyst. Good isocyanurate conversion leads to good fire properties. At the same time, compressive strength and dimensional stability of the foam is optimised. But, also, in faster systems (string time between 30 and 40 seconds) the use of a carboxylic acid in combination with a trimerisation catalyst leads to improved processing for PIR foams and a higher isocyanurate conversion.

The carboxylic acids useful in the practice of the present invention generally have molecular weights below about 250, preferably below 200. In a preferred embodiment of the present invention, the carboxylic acids have molecular weights in the range 50 to 150.

DETAILED DESCRIPTION OF THE INVENTION

The present invention involves a method for making rigid urethane-modified polyisocyanurate foams from polyisocyanates and polyfunctional isocyanate-reactive components in the presence of blowing agents and in the presence of a trimerisation catalyst and a carboxylic acid.

A good isocyanurate conversion can be achieved in lamination systems over a range of panel thicknesses using the same polyol masterbatch. The slow reaction speed required for high thickness panels is achieved by employing a carboxylic acid together with a trimerisation catalyst. Good isocyanurate conversion leads to good fire properties. At the same time, compressive strength and dimensional stability of the foam is optimised. But, also, in faster systems (string time between 30 and 40 seconds) the use of a carboxylic acid in combination with a trimerisation catalyst leads to improved processing for PIR foams and a higher isocyanurate conversion.

The carboxylic acids useful in the practice of the present invention generally have molecular weights below about 250, preferably below 200. In a preferred embodiment of the present invention, the carboxylic acids have molecular weights in the range 50 to 150. Preferably, the carboxylic acids to be used in the present invention have a pKa value in water of between 1 and 5.5, more preferably between 1.2 and 5, most preferably between 1.8 and 4.8. In a preferred embodiment of the present invention, functionalised carboxylic acids are used; these are organic carboxylic acids containing at least one additional OH, COOH, SH, $NH_2$, NHR, $NO_2$ or halogen functional group, wherein R is an alkyl, cycloalkyl or aryl group. Introducing an unsaturation also qualifies as a functional group. Preferably, the carboxylic acid is functionalised in α or β position with respect to the carboxyl group.

Functionalised carboxylic acids suitable for use in the present invention have the general formula $X_n$—R'—COOH wherein X is OH, COOH, SH, $NH_2$, NHR, $NO_2$ or halogen and R' is an at least divalent hydrocarbon moiety, typically an at least divalent linear or branched aliphatic hydrocarbon moiety and/or an at least divalent alicyclic or aromatic hydrocarbon moiety, n is an integer having a value of at least 1 and allows for mono and polyfunctional substitution on the hydrocarbon moiety. The "at least divalent hydrocarbon moiety" can be a saturated or unsaturated moiety of 1 to 20 carbon atoms, including a linear aliphatic moiety, a branched aliphatic moiety, an alicyclic moiety or an aromatic moiety. Stated otherwise, R' can, for example, be a linear or branched alkylene group of 1 to 10 carbon atoms, a cyclic alkylene group of 4 to 10 carbon atoms, or an arylene, an alkarylene or an ararylene group of 6 to 20 carbon atoms. Specific, non-limiting examples of suitable hydrocarbon moieties include methylene, ethylene, n-propylene, isopropylene, n-butylene, isobutylene, n-amylene, n-decylene, 2-ethylhexylene, o-, m-, p-phenylene, ethyl-p-phenylene, 2,5-naphthylene, p,p'-biphenylene, cyclopentylene, cycloheptylene, xylylene, 1,4-dimethylenephenylene and the like. While the above-noted radicals have two available substitution sites, at least one for a carboxyl group and one for an additional OH, COOH, SH, $NH_2$, NHR, $NO_2$ or halogen group, it is contemplated that additional hydrogens on the hydrocarbon could be replaced with further carboxyl and/or OH, SH, $NH_2$, NHR, $NO_2$ or halogen groups. Preferably, X is OH or COOH, n is 1, R' is a linear or branched aliphatic or aromatic hydrocarbon having 2 to 6 carbon atoms The following carboxylic acids are illustrative of compounds suitable for practicing the present invention: citric acid, dimethylolpropionic acid, bis-(hydroxymethyl)propionic acid, bishydroxypropionic acid, salicylic acid, m-hydroxy benzoic acid, p-hydroxy benzoic acid, dihydroxybenzoic acid, glycolic acid, β-hydroxybutyric acid, cresotic acid, 3-hydroxy-2-naphthoic acid, lactic acid, tartaric acid, malic acid, maleic acid, resorcylic acid, hydroferulic acid, glycine, alanine, acetic acid, mercaptoacetic acid and the like. Most preferred carboxylic acids are lactic acid, acetic acid, malic acid, maleic acid and salicylic acid. At least one of said carboxylic acids is used; mixtures of two or more of these acids can be used as well. The carboxylic acid is generally used in an amount ranging from 0.05 to 5% by weight based on the isocyanate-reactive composition, preferably about 0.1% to 2%.

Any compound that catalyses the isocyanate trimerisation reaction can be used as trimerisation catalyst, such as tertiary amines, triazines, and, most preferably, metal salt trimerisation catalysts. Examples of suitable metal salt trimerisation catalysts are alkali metal salts of organic carboxylic acids. Preferred alkali metals are potassium and sodium. And preferred carboxylic acids are acetic acid and 2-ethylhexanoic acid. Preferred metal salt trimerisation catalysts are potassium acetate (commercially available as POLYCAT® 46 catalyst from Air Products and Catalyst LB from Huntsman Polyurethanes) and, most preferably, potassium 2-ethylhexanoate (commercially available as DABCO® K15 catalyst from Air Products). Two or more different metal salt trimerisation catalysts can be used in the process of the present invention.

The metal salt trimerisation catalyst is generally used in an amount ranging from 0.5 to 5% by weight based on the isocyanate-reactive composition, preferably about 1 to 3%.

In general, an almost stoichiometric ratio of acid/metal salt is used, especially if DABCO K15 catalyst or Catalyst LB are used as metal salt trimerisation catalyst. A particularly preferred combination of carboxylic acid and metal salt trimerisation catalyst is lactic acid together with DABCO K15 catalyst.

In addition to this metal salt trimerisation catalyst, other types of trimerisation catalysts and urethane catalysts can be used. Examples of these additional catalysts include dimethylcyclohexylamine, triethylamine, pentamethylenediethylenetriamine, tris (dimethylamino-propyl) hydrotriazine (commercially available as JEFFCATO® TR 90 catalyst from Huntsman Petrochemical Corporation), dimethylbenzylamine (commercially available as JEFFCAT BDMA catalyst from Huntsman Petrochemical Corporation). They are used in amounts ranging from 0.5 to 8% by weight based on the isocyanate-reactive composition. In general, the total amount of trimerisation catalyst is between 0.4 and 4.5% and the total amount of urethane catalyst ranges from 0.1 to 3.5% by weight based on the isocyanate-reactive composition.

The reaction is typically carried out an isocyanate index of 150 to 450%, preferably at an isocyanate index of 180 to 300%. The term isocyanate index as used herein is meant to be the molar ratio of NCO-groups over reactive hydrogen atoms present in the foam formulation, given as a percentage. In terms of "excess isocyanate", which is the weight percentage of isocyanate in the total formulation which is not used for the OH/NCO reaction, this means between 10 and 60%.

The rigid urethane-modified polyisocyanurate foam produced according to the process of the present invention generally is closed-celled (i.e. the open cell content is less than 20%).

Suitable isocyanate-reactive compounds to be used in the process of the present invention include any of those known in the art for the preparation of rigid polyurethane or urethane-modified polyisocyanurate foams. Of particular importance for the preparation of rigid foams are polyols and polyol mixtures having average hydroxyl numbers of from 160 to 1000, especially from 200 to 700 mg KOH/g, and hydroxyl functionalities of from 2 to 8, especially from 2 to 6. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids, DMT-scrap or digestion of PET by glycols. Still further, suitable polymeric polyols include hydroxyl-terminated polythioethers, polyamides, polyesteramides, polycarbonates, polyacetals, polyolefins and polysiloxanes.

Preferably, the isocyanate-reactive composition contains at least 30 wt % of polyester polyols. In a particularly preferred embodiment of the present invention, almost all of the isocyanate-reactive compounds are polyester polyols. Suitable organic polyisocyanates for use in the process of the present invention include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates, which may be mentioned, include the aliphatic diisocyanates such as isophorone diisocyanate, 1,6-diisocyanatohexane and 4,4'-diisocyanatodicyclohexylmethane.

The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

Any of the physical blowing agents known for the production of rigid polyurethane or urethane-modified polyisocyanurate foam can be used in the process of the present invention. Examples of these include dialkyl ethers, cycloalkylene ethers and ketones, fluorinated ethers, chlorofluorocarbons, perfluorinated hydrocarbons, hydrochlorofluorocarbons, hydrofluorocarbons, and in particular hydrocarbons.

Examples of suitable hydrochlorofluorocarbons include 1-chloro-1,2-difluoroethane, 1-chloro-2,2-difluoroethane, 1-chloro-1,1-difluoroethane, 1,1-dichloro-1-fluoroethane and monochlorodifluoromethane.

Examples of suitable hydrofluorocarbons include 1,1,1,2-tetrafluoroethane (HFC 134a), 1,1,2,2-tetrafluoroethane, trifluoromethane, heptafluoropropane, 1,1,1-trifluoroethane, 1,1,2-trifluoroethane, 1,1,1,2,2-pentafluoropropane, 1,1,1,3-tetrafluoropropane, 1,1,1,3,3-pentafluoropropane (HFC 245fa), 1,1,3,3,3-pentafluoropropane, 1,1,1,3,3-pentafluoro-n-butane (HFC 365mfc), 1,1,1,4,4,4-hexafluoro-n-butane, 1,1,1,2,3,3,3-heptafluoropropane (HFC 227ea) and mixtures of any of the above.

Suitable hydrocarbon blowing agents include lower aliphatic or cyclic, linear or branched hydrocarbons such as alkanes, alkenes and cycloalkanes, preferably having from 4 to 8 carbon atoms. Specific examples include n-butane, iso-butane, 2,3-dimethylbutane, cyclobutane, n-pentane, iso-pentane, technical grade pentane mixtures, cyclopentane, methylcyclopentane, neopentane, n-hexane, iso-hexane, n-heptane, iso-heptane, cyclohexane, methylcyclohexane, 1-pentene, 2-methylbutene, 3-methylbutene, 1-hexene and any mixture of the above. Preferred hydrocarbons are n-butane, iso-butane, cyclopentane, n-pentane and isopentane and any mixture thereof, in particular mixtures of n-pentane and isopentane (preferred weight ratio 3:8), mixtures of cyclopentane and isobutane (preferred weight ratio 8:3), mixtures of cyclopentane and n-butane and mixtures of cyclopentane and iso- or n-pentane (preferred weight ratio between 6:4 and 8:2).

Generally, water or other carbon dioxide-evolving compounds are used together with the physical blowing agents. Where water is used as chemical co-blowing agent typical amounts are in the range from 0.2 to 5%, preferably from 0.5 to 3% by weight based on the isocyanate-reactive compound. Water can also be used as the sole blowing agent with no additional physical blowing agent being present. Because some of the acids, such as lactic acid, also show a blowing capacity, the water levels can be reduced (to levels below 1%) which improves cure and adhesion of the foam.

The total quantity of blowing agent to be used in a reaction system for producing cellular polymeric materials will be readily determined by those skilled in the art, but will typically be from 2 to 25% by weight based on the total reaction system. Preferred blowing agents are water and/or hydrocarbons and/or hydrofluorocarbons.

In addition to the polyisocyanate and polyfunctional isocyanate-reactive compositions and the blowing agents, the foam-forming reaction mixture will commonly contain one or more other auxiliaries or additives conventional to formulations for the production of rigid polyurethane and urethane-modified polyisocyanurate foams. Such optional additives include crosslinking agents, for example, low molecular weight polyols such as triethanolamine, surfactants, fire retardants, for example, halogenated alkyl phosphates, such as tris chloropropyl phosphate, and fillers such as carbon black.

In particular, in the present invention, additives can be used to further improve the adhesion of the foam to the facer material. These include triethylphosphate, mono- and poly-ethyleneglycol and propylene carbonate, either alone or mixtures thereof.

In operating the process for making rigid foams according to the invention, the known one-shot, prepolymer or semi-prepolymer techniques may be used together with conventional mixing methods.

It is convenient in many applications to provide the components for polyurethane production in pre-blended formulations based on each of the primary polyisocyanate and isocyanate-reactive components. In particular, many reaction systems employ a polyisocyanate-reactive composition that contains the major additives such as the blowing agent, the catalyst and the surfactant in addition to the polyisocyanate-reactive component or components.

Therefore, the present invention also provides a polyfunctional isocyanate-reactive composition which contains the isocyanate-reactive components, the trimerisation catalyst, the carboxylic acid, optionally in combination with the blowing agent, further catalysts and surfactants.

The various aspects of this invention are illustrated, but not limited by the following examples.

EXAMPLES

In these examples the following ingredients are used:
Polyol 1: an aromatic polyester polyol available from Stepan under the name STEPANPOL PS 2352 polyol
Polyol 2: a sucrose initiated polyether polyol of OH value 155 mg KOH/g
Polyol 3: an aromatic amine initiated polyether polyol of OH value 310 mg KOH/g
Polyol 4: an aromatic PET-based polyester polyol
Poyol 5: a sucrose/amine initiated polyether polyol of OH value 585 mg KOH/g
TEP: triethylphosphate
TCPP: tris chloropropyl phosphate
DEEP: diethyl ethyl phosphonate
PEG 300: polyethyleneglycol of MW 300
DC 5357: silicone surfactant available from Air Products
DC 193: silicone surfactant available from Air Products
L6900: silicone surfactant available from Crompton OSi
NIAX A1 amine: amine catalyst available from Air Products
JEFFCAT PMDETA catalyst: amine catalyst available from Huntsman Petrochemical Corporation
JEFFCAT TR90 catalyst: amine catalyst available from Huntsman Petrochemical Corporation
SFB: dimethylcyclohexylamine catalyst (DMCHA) available from Bayer
Catalyst LB: potassium acetate catalyst available from Huntsman Polyurethanes
DABCO K15 catalyst: potassium 2-ethylhexanoate trimerisation catalyst available from Air Products
Isocyanate: polymeric MDI

Example 1

Rigid polyisocyanurate foam panels of varying thickness (indicated between brackets) were prepared at an isocyanate index of 200% from the ingredients listed in Table 1 below. The reaction profile was followed in terms of cream time (CT), which is the time it takes for the foam to start expanding, full cup time (FC), which is the time it takes the rising foam to reach the top-rim of the cup, string time (ST), which is the time it takes to pull the first strings from the foam, and end of rise time (ER), which is the time it takes for the foam not to grow anymore in rise-direction. Closed cell content (CCC) of the obtained foam was measured according to standard ASTM D2856 and core density according to standard DIN 5320. The reaction to fire was measured by the B2 flame spread test according to standard DIN 4102. This is an indicator for the isocyanurate conversion: low isocyanurate conversions result in poor fire performance.

TABLE 1

|  |  | Foam No. | | | | |
| --- | --- | --- | --- | --- | --- | --- |
|  |  | 1 (4 cm) | 2 (10 cm) | 3 (20 cm) | 4 (10 cm) | 5 (20 cm) |
| Polyol 1 | pbw | 7.24 | 7.02 | 6.66 | 7.53 | 7.15 |
| Polyol 2 | pbw | 4.46 | 4.32 | 4.1 | 4.63 | 4.4 |
| Polyol 3 | pbw | 10.03 | 9.72 | 9.22 | 10.42 | 9.91 |

TABLE 1-continued

| | | Foam No. | | | | |
|---|---|---|---|---|---|---|
| | | 1 (4 cm) | 2 (10 cm) | 3 (20 cm) | 4 (10 cm) | 5 (20 cm) |
| TEP | pbw | 4.9 | 4.97 | 5.12 | 5.1 | 5.28 |
| PEG 300 | pbw | 4.68 | 4.54 | 4.3 | 4.86 | 4.62 |
| DC 5357 | pbw | 1.11 | 1.19 | 1.23 | 1.27 | 1.32 |
| NIAX A1 amine | pbw | 0.02 | 0.02 | 0.02 | 0.02 | 0.02 |
| SFB | pbw | 0.45 | 0.43 | 0.41 | 0.46 | 0.44 |
| DABCO K15 catalyst | pbw | 0.67 | 0.39 | 0.15 | 0.67 | 0.68 |
| Water | pbw | 0.94 | 1.02 | 1.13 | 0.81 | 0.88 |
| Lactic acid | pbw | | | | 0.22 | 0.37 |
| Isocyanate | pbw | 65.5 | 66.38 | 67.65 | 64 | 64.9 |
| CT | sec | 9 | 12 | 15 | 12 | 16 |
| FC | sec | 27 | 37 | 52 | 41 | 56 |
| ST | sec | 33 | 49 | 73 | 48 | 75 |
| ER | sec | 55–60 | 80 | | 85 | |
| CCC | % | 86 | 88 | 87 | 88 | 86 |
| Density | kg/m$^3$ | 41.6 | 39.8 | 40.4 | 42.1 | 37 |
| B2 | cm | 13 | 14 | 18 | 13 | 12 |

The results given in Table 1 indicate that reducing the speed of the system by decreasing the K15 level is detrimental to isocyanurate conversion. However, the use of lactic acid in combination with K15 as in foams numbers 4 and 5 give enhanced isocyanurate conversion. Using this approach, it is possible to achieve the same degree of isocyanurate conversion for slower systems (50 sec string time for 10 cm thickness; 70 sec string time for 20 cm thickness) as it is for fast systems (30 sec string for 4 cm thickness).

Example 2

Rigid polyisocyanurate foams were prepared at an isocyanate index of 170% from the ingredients listed in Table 2 below. Properties were measured as in Example 1 above. The results are presented in Table 2.

TABLE 2

| | | Foam No. | | | |
|---|---|---|---|---|---|
| | | 6 | 7 | 8 | 9 |
| Polyol 5 | pbw | 29 | 29 | 29 | 29 |
| Polyol 4 | pbw | 44 | 44 | 44 | 44 |
| TCPP | pbw | 20 | 20 | 20 | 20 |
| Water | pbw | 2 | 2 | 2 | 2 |
| DMCHA | pbw | 1 | 1 | 1 | 1 |
| DC 193 | pbw | 1 | 1 | 1 | 1 |
| JEFFCAT PMDETA catalyst | pbw | 0.3 | 0.3 | 0.3 | 0.3 |
| DABCO K15 catalyst | pbw | 1.7 | 1.7 | | |
| Catalyst LB | pbw | | | 1.7 | 1.7 |
| Lactic acid | pbw | 1 | | 1.2 | |
| Salicylic acid | pbw | | 1.7 | | 2.1 |
| Isocyanate | pbw | 180 | 180 | 180 | 180 |
| CT | sec | 11 | 15 | 16 | 16 |
| FC | sec | 22 | 34 | 31 | 37 |
| ST | sec | 29 | 43 | 36 | 45 |
| ER | sec | 70 | 85 | 80 | 90 |
| Density | g/l | 47.5 | 56.6 | 45.7 | 55.9 |
| CCC | % | 95.3 | 93.2 | 94.2 | 93.4 |
| B2 | cm | 8 | 8.5 | 8.7 | 9 |

Example 3

Rigid polyisocyanurate foams were prepared at an isocyanate index of 230% from the ingredients listed in Table 3 below. Properties were measured as in Example 1 above. The results are presented in Table 3.

TABLE 3

| | | Foam No. 10 |
|---|---|---|
| Polyol 4 | pbw | 84 |
| DEEP | pbw | 10 |
| Water | pbw | 0.7 |
| JEFFCAT TR90 catalyst | pbw | 0.8 |
| L6900 | pbw | 1.6 |
| JEFFCAT PMDETA catalyst | pbw | 0.2 |
| DABCO K15 catalyst | pbw | 1.2 |
| Catalyst LB | pbw | 0.3 |
| Lactic acid | pbw | 1.2 |
| n-pentane | pbw | 7 |
| Isocyanate | pbw | 158 |
| CT | sec | 22 |
| ST | sec | 85 |
| Density | g/l | 36.5 |
| CCC | % | 94 |
| B2 | cm | 12 |

What is claimed:

1. A process for preparing rigid urethane-modified polyisocyanurate foam comprising the step of reacting an organic polyisocyanate with a polyfunctional isocyanate-reactive component comprising at least 30 wt % of polyester polyols in the presence of a blowing agent, selected from the group consisting of, an alkane, an alkene, a cycloalkane, or combinations thereof, wherein the blowing agent consists of carbon and hydrogen atoms, a urethane catalyst, and a metal salt trimerisation catalyst characterized in that the process is carried out in the presence of a carboxylic acid that is functionalised with at least one OH, SH, $NH_2$, NHR, $NO_2$ or halogen functional group and R is an alkyl, cycloalkyl or aryl group, wherein the urethane catalyst is used in an amount ranging from 0.1 to 3.5% by weight based on the isocyanate-reactive component and the metal salt trimerisation catalyst is used in an amount ranging from 0.4 to 4.5% by weight based on the isocyanate-reactive component.

2. The process according to claim 1 wherein the carboxylic acid has a molecular weight below 250.

3. The process according to claim 1 wherein the carboxylic acid has a pKa value in water of between 1 and 5.5.

4. The process according to claim 2 wherein the carboxylic acid has a pKa value in water of between 1 and 5.5.

5. The process according to claim 1 wherein the carboxylic acid is functionalised in α or β position with respect to the carboxyl group.

6. The process according to claim 5 wherein said functionalised carboxylic acid corresponds to the general formula $X_n$—R'—COOH wherein X is OH, SH, $NH_2$, NHR, $NO_2$ or halogen, R' is an at least divalent hydrocarbon moiety, n is an integer having a value of at least 1 and allows for mono and polyfunctional substitution on the hydrocarbon moiety.

7. The process according to claim 1 wherein said carboxylic acid is used in an amount ranging from 0.05 to 5% by weight based on the isocyanate-reactive component.

8. The process according to claim 2 wherein said carboxylic acid is used in an amount ranging from 0.1 to 2% by weight based on the isocyanate-reactive component.

9. The process according to claim 1 wherein the metal salt trimerisation catalyst is an alkali metal salt of an organic carboxylic acid.

10. The process according to claim 2 wherein the metal salt trimerisation catalyst is an alkali metal salt of an organic carboxylic acid.

11. The process according to claim 10 wherein the metal salt trimerisation catalyst is potassium acetate or potassium 2-ethylhexanoate.

12. The process according to claim 1 wherein the reaction is carried out at an isocyanate index of 150 to 450%.

13. A rigid urethane-modified polyisocyanurate foam obtained by reacting an organic polyisocyanate with a polyfunctional isocyanate-reactive component comprising at least 30 wt % of polyester polyols in the presence of a blowing agent, selected from the group consisting of, an alkane, an alkene, a cycloalkane, or combinations thereof, wherein the blowing agent consists of carbon and hydrogen atoms, a urethane catalyst, and a metal salt trimerisation catalyst characterized in that the process is carried out in the presence of a carboxylic acid functionalised with at least one OH, SH, $NH_2$, NHR, $NO_2$ or halogen functional group, wherein R is an alkyl, cycloalkyl or aryl group, wherein the urethane catalyst is used in an amount ranging from 0.1 to 3.5% by weight based on the isocyanate-reactive component and the metal salt trimerisation catalyst is used in an amount ranging from 0.4 to 4.5% by weight based on the isocyanate-reactive component.

14. A process for preparing rigid urethane-modified polyisocyanurate foam comprising the step of reacting an organic polyisocyanate with a polyfunctional isocyanate-reactive component comprising at least 30 wt % of polyester polyols in the presence of a blowing agent and a metal salt trimerisation catalyst characterized in that the process is carried out in the presence of a functionalised carboxylic acid having at least one OH, SH, $NH_2$, NHR, $NO_2$, or halogen functional group, wherein R is an alkyl, cycloalkyl or aryl group and the metal salt trimerisation catalyst is used in an amount ranging from 0.5 to 5% by weight based on the isocyanate-reactive component and the functionalised carboxylic acid is used in an amount ranging from 0.1 to 2% by weight based on the isocyanate-reactive component; and wherein the blowing agent is selected from the group consisting of, an alkane, an alkene, a cycloalkane, or combinations thereof, and blowing agent consists of carbon and hydrogen atoms.

15. The process according to claim 13 wherein the carboxylic acid is functionalised in α or β position with respect to the carboxyl group.

16. The process according to claim 13 wherein the carboxylic acid corresponds to the general formula $X_n$—R'—COOH wherein X is OH, SH, $NH_2$, NHR, $NO_2$ or halogen, R' is an at least divalent hydrocarbon moiety, n is an integer having a value of at least 1 and allows for mono and polyfunctional substitution on the hydrocarbon moiety.

17. The process according to claim 1, wherein the blowing agent is selected from the group of n-butane, iso-butane, 2,3-dimethylbutane, cyclobutane, n-pentane, iso-pentane, technical grade pentane mixtures, cyclopentane, methylcyclopentane, neopentane, n-hexane, iso-hexane, n-heptane, iso-heptane, cyclohexane, methylcyclohexane, 1-pentene, 2-methylbutene, 3-methylbutene, 1-hexene, and mixtures thereof.

18. The process according to claim 13, wherein the blowing agent is selected from the group of n-butane, iso-butane, 2,3-dimethylbutane, cyclobutane, n-pentane, iso-pentane, technical grade pentane mixtures, cyclopentane, methylcyclopentane, neopentane, n-hexane, iso-hexane, n-heptane, iso-heptane, cyclohexane, methylcyclohexane, 1-pentene, 2-methylbutene, 3-methylbutene, 1-hexene, and mixtures thereof.

19. The process according to claim 14, wherein the blowing agent is selected from the group of n-butane, iso-butane, 2,3-dimethylbutane, cyclobutane, n-pentane, iso-pentane, technical grade pentane mixtures, cyclopentane, methylcyclopentane, neopentane, n-hexane, iso-hexane, n-heptane, iso-heptane, cyclohexane, methylcyclohexane, 1-pentene, 2-methylbutene, 3-methylbutene, 1-hexene, and mixtures thereof.

* * * * *